March 23, 1926.

W. R. McGOWEN 1,578,055

VEHICLE BUMPER

Filed August 13, 1924        2 Sheets-Sheet 1

INVENTOR
William R. McGowen
By Kay, Totten & Martin,
Attorneys

March 23, 1926.  
W. R. McGOWEN  
VEHICLE BUMPER  
Filed August 13, 1924

1,578,055

2 Sheets-Sheet 2

INVENTOR  
William R. McGowen  
By Kay, Totten & Martin,  
Attorneys.

Patented Mar. 23, 1926.

1,578,055

UNITED STATES PATENT OFFICE.

WILLIAM R. McGOWEN, OF CHICAGO, ILLINOIS, ASSIGNOR TO UNITED STATES CHAIN & FORGING COMPANY, OF PITTSBURGH, PENNSYLVANIA, A CORPORATION OF DELAWARE.

VEHICLE BUMPER.

Application filed August 13, 1924. Serial No. 731,844.

*To all whom it may concern:*

Be it known that I, WILLIAM R. McGOWEN, a citizen of the United States, and resident of Chicago, in the county of Cook and State of Illinois, have invented a new and useful Improvement in Vehicle Bumpers; and I do hereby declare the following to be a full, clear, and exact description thereof.

My invention relates to vehicle bumpers, and particularly to bumper bars for protecting automobiles and the like from damage through impact with extraneous objects.

One object of my invention is to provide a bumper which is of such form that it may be satisfactorily employed upon either the front or the rear of a vehicle, notwithstanding the fact that different conditions in the way of requirements for protection and the like obtain as between the ends of the vehicle.

Another object of my invention is to provide a bumper having a protection area relatively great compared to the quantity of material required to construct the bumper.

Still another object of my invention is to simplify and improve generally the construction and adaptability of devices of the character referred to.

Specifically, my invention comprises a reversible bumper structure that may be satisfactorily employed to protect either the radiator and adjacent delicate parts at the front of a vehicle, or may be so arranged at the rear of the vehicle as to adequately protect a relatively low-hung gasoline tank, while at the same time a minimum obstruction is presented to the removal of the spare tire carrier. The structure referred to avoids the necessity of requiring different style bumpers for the front and back of a vehicle.

Figure 1:
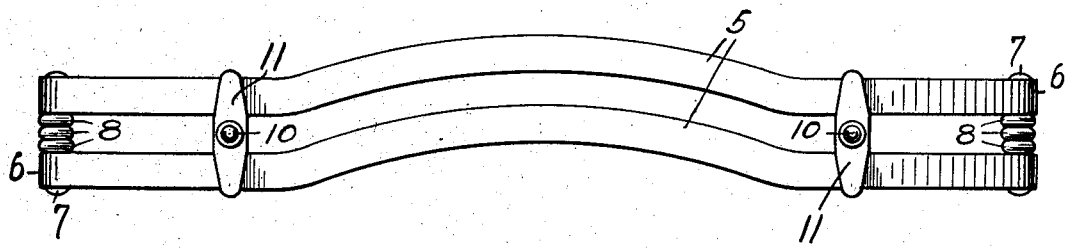
Figure 2:
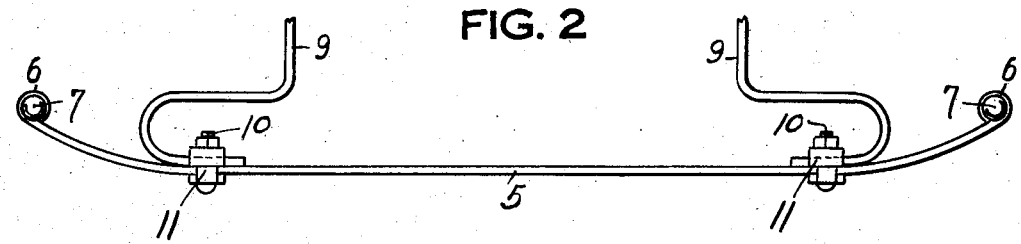
Figure 3:
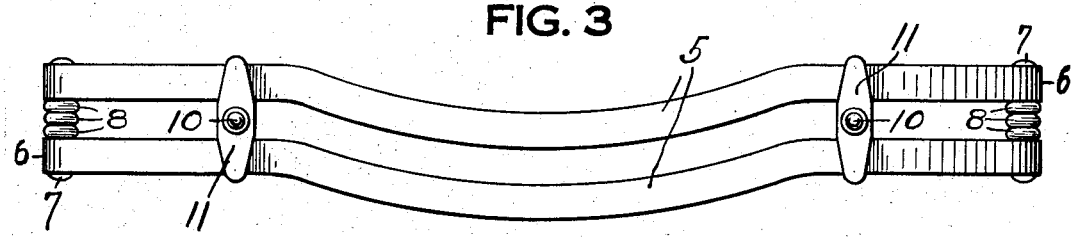
Figure 4:
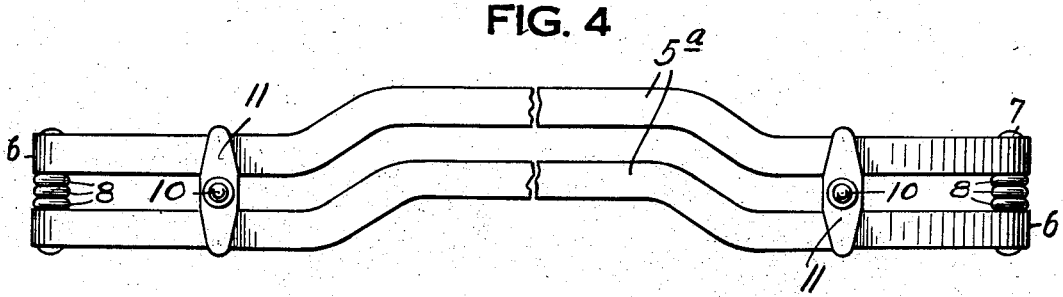
Figure 5:
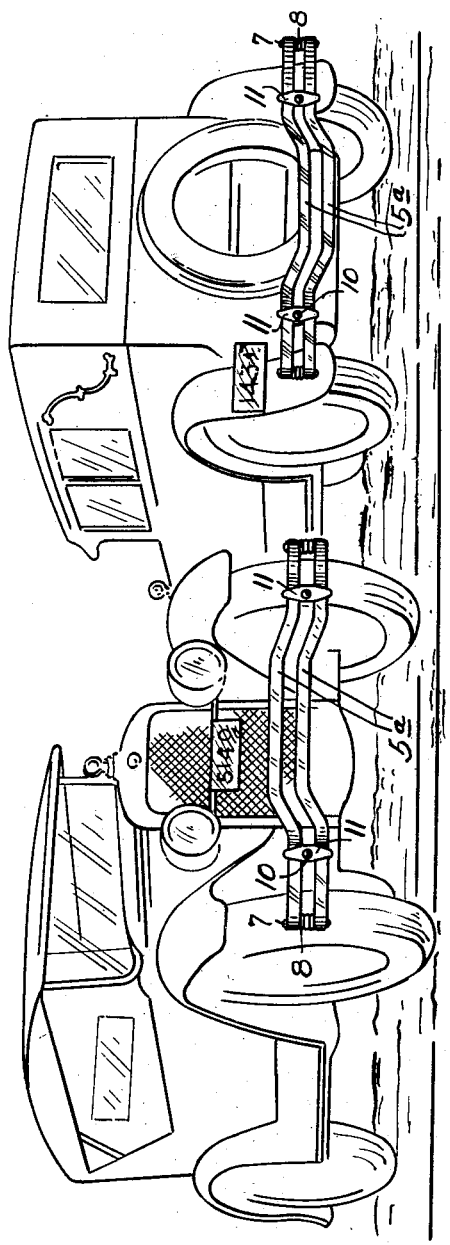

Some of the forms which my invention may take are shown in the accompanying drawing, wherein Fig. 1 is a front elevational view of a bumper bar construction embodying my invention, as applied to the front end of a vehicle; Fig. 2 is a partial plan view thereof; Fig. 3 is an elevational view of the construction of Fig. 1, in reversed position; Fig. 4 is a modified form of construction embodying my invention, and Fig. 5 shows the manner in which the bars may be applied to the front and rear ends, respectively, of an automobile.

The device consists of a pair of parallel flat bars 5 of spring steel or the like, upwardly curved at their intermediate portions, and having eye portions 6 formed at their outer ends. Bolts 7 extend through the eye portions 6, and serve as tie members for securing the ends of the bars 5 in proper relative positions. Spacer members 8 in the form of washers or the like are provided for maintaining the bars 5 in proper vertical relation.

The bars 5 are supported from the vehicle body proper by bracket members 9, only a portion of which is shown, which may be attached to the bars 5 by bolts 10 and clamping devices 11 of any desired form.

In Fig. 4, the bars 5ª instead of being arched at their intermediate portions are angularly deflected and extend in substantially straight lines instead of lying in arcs as in Fig. 1. The bars 5ª are secured together in the same manner as are the bars 5.

In operation, the bumper may be attached to the front of the vehicle in any well known manner, usually with the intermediate deflecting portion thereof extending upward in front of the radiator and adjacent parts of the vehicle, as shown at the left hand side of Fig. 5. In applying the bumper to the rear of the vehicle, on most cars, it will be desirable to turn it in such manner that the deflected or intermediate portion extends downwardly as in Fig. 3, in order to protect the gasoline tank, as shown at the right hand side of Fig. 5. Besides providing the maximum protection for the gasoline tank, the depression in the bumper when applied to the rear permits the more ready application and removal of the spare wheel or tire. This is of particularly advantage because the spare wheel, particularly in the case of a disc wheel with a tire applied, is of considerable weight, and in many cases a bar is employed as a lever to lift the wheel into place upon the carrier brackets, and the height to which the wheel may be raised by the lever bar is limited. By reason of the depression in the bar, when applied to the rear of the vehicle, the wheel need not be raised through as great a height as would be the case if the bars, or one of them, were disposed in substantially a straight line from end to end.

Heretofore it has been thought necessary in some constructions to make the bumper bar in two parts, each hinged at its outer end so that the inner ends may be raised to a substantially vertical position to permit ready application and removal of the spare wheel.

From the foregoing it will be seen that I provide a bumper applicable to either end of the vehicle which, at the same time, affords a maximum protection at the points most needed and the advantages, of parallel deflecting bars are secured, this reducing the number of bumpers and parts thereof that must be carried in stock. Various other advantages will readily occur to those familiar with the art.

Changes in detail and general arrangement may be made without departing from the spirit and scope of my invention as defined in the accompanying claim.

I claim as my invention:

A vehicle bumper comprising a plurality of vertically spaced parallel impact bars, each vertically off-set at its mid-portion and unobstructed at points therebeneath or above said off-set portion except by the adjacent parallel bar, whereby said structure may protect one portion of a vehicle when mounted with the off-set portions extending upwardly and may protect a relatively low portion of a vehicle when the bumper is reversed so that the off-set portions extend downwardly, means for securing said bars together at their ends, and means intermediate each of said ends and said off-set portions, for securing said bars together and to bracket arms, the off-set portions of the bars being independently flexible.

In testimony whereof I, the said WILLIAM R. McGOWEN, have hereunto set my hand.

WILLIAM R. McGOWEN.